United States Patent
Joy et al.

(10) Patent No.: US 9,858,324 B2
(45) Date of Patent: Jan. 2, 2018

(54) TRUSTED DOWNLOAD TOOLKIT

(71) Applicant: Northrop Grumman Systems Corporation, Falls Church, VA (US)

(72) Inventors: William Joy, Melbourne, FL (US); Armen Djougarian, Flushing, NY (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 157 days.

(21) Appl. No.: 14/302,735

(22) Filed: Jun. 12, 2014

(65) Prior Publication Data
US 2014/0372460 A1    Dec. 18, 2014

Related U.S. Application Data

(60) Provisional application No. 61/834,644, filed on Jun. 13, 2013.

(51) Int. Cl.
G06F 17/30       (2006.01)

(52) U.S. Cl.
CPC .............................. G06F 17/30572 (2013.01)

(58) Field of Classification Search
CPC ................................................ G06F 17/30572
See application file for complete search history.

(56) References Cited

U.S. PATENT DOCUMENTS

| | | | |
|---|---|---|---|
| 5,596,718 A | 1/1997 | Boebert et al. | |
| 6,108,787 A | 8/2000 | Anderson et al. | |
| 7,509,434 B1 * | 3/2009 | Crosmer | H04L 63/105 709/223 |
| 8,041,833 B2 | 10/2011 | Rossbach et al. | |
| 8,185,944 B2 | 5/2012 | Schnackenberg et al. | |
| 8,327,038 B2 | 12/2012 | Alcouffe et al. | |
| 8,397,286 B2 | 3/2013 | Declety et al. | |
| 8,635,691 B2 * | 1/2014 | Vogel | G06F 21/6245 726/22 |
| 9,239,909 B2 * | 1/2016 | Tedesco | G06F 21/00 |
| 2002/0073313 A1 | 6/2002 | Brown et al. | |
| 2002/0112181 A1 | 8/2002 | Smith | |
| 2002/0188676 A1 * | 12/2002 | Iai | G06Q 30/02 709/203 |
| 2005/0132070 A1 * | 6/2005 | Redlich | G06F 21/6209 709/228 |

(Continued)

OTHER PUBLICATIONS

"Industrial Security Letter", Department of Defense, Defense Security Service, Industrial Security Program Office, Alexandria, VA, Oct. 11, 2007.

(Continued)

*Primary Examiner* — Apu Mofiz
*Assistant Examiner* — Jared Bibbee
(74) *Attorney, Agent, or Firm* — Michael D. Lazzara; Leech Tishman Fuscaldo & Lampl

(57) ABSTRACT

A method of extracting unclassified data from a collection of data including both classified data and unclassified data, includes: providing a plain text format file including a plurality of attributes; using the attributes to identify unclassified data within a collection of data that includes a combination of unclassified and classified data; and extracting the identified unclassified data from the collection of data. An apparatus that implements the method is also provided.

17 Claims, 1 Drawing Sheet

(56) References Cited

U.S. PATENT DOCUMENTS

| | | | |
|---|---|---|---|
| 2005/0138110 A1* | 6/2005 | Redlich | C07K 14/70575 709/201 |
| 2006/0026114 A1* | 2/2006 | Gregoire | G06F 17/30867 |
| 2006/0143449 A1 | 6/2006 | Groger et al. | |
| 2008/0002911 A1* | 1/2008 | Eisen | G06F 21/6245 382/283 |
| 2008/0022353 A1 | 1/2008 | Mayer et al. | |
| 2008/0168135 A1* | 7/2008 | Redlich | G06Q 10/10 709/204 |
| 2009/0178144 A1* | 7/2009 | Redlich | G06F 21/6209 726/27 |
| 2009/0259622 A1* | 10/2009 | Kolz | G06F 17/30327 |
| 2009/0271858 A1 | 10/2009 | Cooke et al. | |
| 2010/0010968 A1* | 1/2010 | Redlich | G06F 17/30672 707/E17.014 |
| 2010/0070505 A1* | 3/2010 | Kao | G06F 21/604 707/740 |
| 2010/0227301 A1* | 9/2010 | Yu | G09B 19/00 434/118 |
| 2010/0333193 A1* | 12/2010 | Goding | G06F 21/74 726/16 |
| 2011/0283143 A1 | 11/2011 | Collins | |
| 2011/0314561 A1* | 12/2011 | Brill | G06F 19/322 726/29 |
| 2013/0212109 A1* | 8/2013 | Evancich | G06F 17/30598 707/740 |
| 2013/0305388 A1* | 11/2013 | Kottilingal | G06F 21/6218 726/28 |
| 2014/0059692 A1* | 2/2014 | Dapp | G06F 21/606 726/26 |
| 2014/0108406 A1* | 4/2014 | Knight | G06F 17/30705 707/737 |

OTHER PUBLICATIONS

"WinHex: Additional Features of Specialist Licenses", X-Ways Software Technology, http://www.winhex.com/winhex/specialist_tools.html.

* cited by examiner

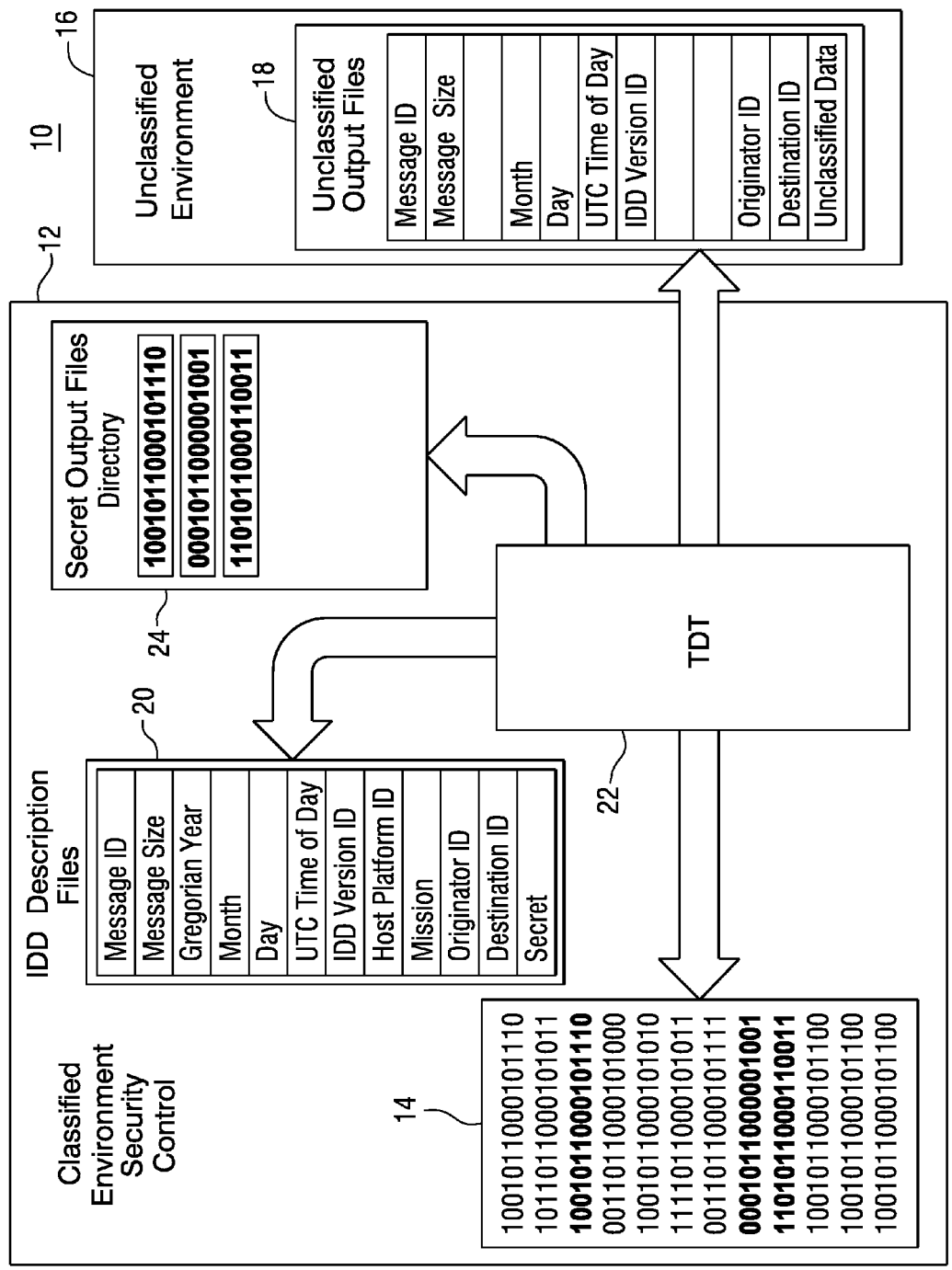

TRUSTED DOWNLOAD TOOLKIT

CROSS-REFERENCE TO RELATED APPLICATION

This application claims the benefit of U.S. Provisional Patent Application Ser. No. 61/834,644, filed Jun. 13, 2013, and titled "Trusted Download Toolkit", which is incorporated herein by reference.

STATEMENT OF GOVERNMENT INTEREST

This invention was made under United States Government Contract Number: N00019-08-C-0023. The United States Government may have rights in the invention in accordance with the contract.

FIELD OF THE INVENTION

The present invention relates to a method and apparatus used to identify unclassified data within a system, program, database, computer file, or other product that includes both classified and unclassified data.

BACKGROUND INFORMATION

In some systems, programs, databases, computer files, or other products, unclassified data that has been produced in a classified (i.e., secret) environment may be mixed with secret data. To work with the unclassified data, a user can either work within the classified environment or separate the unclassified data by manually performing a Trusted Download.

Keeping all data on a classified network requires classified approval and access for all parties including classified hardware, which would not be needed if one were only interested in unclassified data. Unclassified data can be identified manually using an "Each Time Data Approval" process. However, performing a manual review of a large amount of data to identify unclassified data in a system, program, database, computer file, or other product that includes both classified and unclassified data may require significant resources and may not be practical.

It would be desirable to have a method or tool that can automatically extract, decode and/or filter the unclassified data from a collection of both classified and unclassified data, to allow the unclassified data to be processed in an unclassified environment.

SUMMARY OF THE INVENTION

In one embodiment, the present invention provides a method of extracting unclassified data from a collection of data including both classified data and unclassified data. The method includes: providing a plain text format file including a plurality of attributes; using the attributes to identify unclassified data within a collection of data that includes a combination of unclassified and classified data; and extracting the identified unclassified data from the collection of data.

In another embodiment, the present invention provides an apparatus including: a classified environment including a collection of data including both classified data and unclassified data; a plain text format file including a plurality of attributes; an application configured to use the attributes to identify and extract unclassified data from the collection of data; and an unclassified environment including a memory configured to receive the extracted unclassified data.

In other embodiments, the plain text format files can be used to identify and extract data having an identified classification level from a collection of data including both data having the identified classification level and data having a higher classification level.

BRIEF DESCRIPTION OF THE DRAWINGS

FIG. 1 is a block diagram of a system that can be used to practice an embodiment of the invention.

DETAILED DESCRIPTION

In various aspects, the present invention provides a method and/or apparatus that can extract unclassified data from a collection of both classified data and unclassified data.

In one embodiment, the invention provides a method that separates unclassified binary data from a classified binary data, wherein the separation is controlled by human readable textual information as identified by the system data description documentation. The selected unclassified data can be passed to output files that support a manual spot check, National Industrial Security Program Operating Manual (NISPOM) approved, Trusted Download using a trusted and tested process.

In other embodiments, the human readable textual information can be used to identify and extract data having an identified classification level from a collection of data including both data having the identified classification level and data having a higher classification level.

In another embodiment, the invention provides an apparatus including a tool that dynamically decodes and filters classified binary data of a structure unknown to the tool itself, wherein the decoding and filtering is based on the system data description documentation. The tool can be implemented in software, independent of the program being evaluated. The tool selects the specific data that is unclassified, which may, or may not be, imbedded within data or messages that also contain classified data. The unclassified data can be collected into output files to create a trusted and tested source that supports a NISPOM approved spot check manual review for the release of the unclassified data into the unclassified environment. As used in this description, the tool is referred to as a Trusted Download Toolkit (TDT).

The TDT can be implemented in a software application that is written, programmed, or otherwise configured to perform the method and process steps described herein. In one embodiment, the application is written, programmed, or otherwise configured to extract, decode, and filter the unclassified data from binary secret data and places it in plain text files.

FIG. 1 is a block diagram of a system 10 that can be used to practice an embodiment of the invention. The system includes a classified environment 12 (e.g., a classified network), that includes a collection of data 14, which includes both classified data and unclassified data. In this embodiment, the data in the classified environment is shown as binary data.

The system also includes an unclassified environment 16 (e.g., an unclassified network), that includes data storage 18 for receiving unclassified data that is extracted form the classified environment.

Both classified and unclassified data can exist in the form of messages. Messages are repeatable blocks of data that follow certain defined rules. In one example, data structures per message type are described in separate human readable text files. Human readable text files 20, called Interface Description Document (IDD) Format Description Files or in short, Format Files (FF), describe data structures in the classified network on a message type basis. In one embodiment, the FFs are small files that describe each field in a Message Data Structure using up to 14 attributes. The Message Data Structure includes data containing both classified and unclassified data.

The IDD Format Description Files (FF) describe any IDD Message Structure in a simple unified way. They include Basic Fields of Different Types, Repeated Fields, or Data Structures with a provided number of repetitions either as a variable per message within the binary files, or as a constant provided by the IDD. The Data Structures can be nested within each other in any complexity and multiplicity at any hierarchy. Repeated fields can also be a part of repeated data structures at any point. The repeated field is a simple case of a Repeated Data Structure that includes structures common across many fields within the data structure. This simplifies FF development.

Many of the FF attributes can have default values. Therefore for most cases, all attribute values need not be separately provided for each message type. The description provided by the attributes is sufficient to perform the decoding of data based on Data Structures with Unlimited Nesting within data Sub-Structures, with a variable number of repetitions at each subsequent message provided within the raw binary data files or via a constant number of repetitions provided by the IDD. Unlimited nesting of data blocks inside each other refers to including a definition of one data structure inside another one, at any location(s) in any numbers, and other data structures within those ones and so on.

A Trusted Download Toolkit (TDT) 22 is provided as a software application located in the classified environment. The TDT itself is completely independent of the data structures. The TDT can be implemented as a generic application that uses the information provided by the FF to decode any message report written into a binary file. Due to the separation of the TDT from the FF, it is possible to approve each FF for a Trusted Download. The FF files can be approved once and kept under Security Control. In addition, the TDT application itself can be approved once. When approved and compiled, the application goes under Security Control and can be used for decoding of any data stream with any data structure, including structures unknown at the TDT development time and those that have gone through structural updates. That is, for any input file where the data structures for the input data (e.g., test, numbers, reports, etc.) follow a defined data structure criteria that is consistent to the system description documentation, the TDT can be set up to extract the unclassified data from the entire content.

The TDT allows variable length data blocks. Message structures can be described by standard Object Management Group (OMG) Interface Description Document Language (IDL) files. The TDT data structure can enhance IDL structures with additional capabilities like accepting additional information on data structures from outside, only run-time available sources, and other sources. The TDT structure description rules (i.e., the FFs) are written as human traceable, open files that can go down to bit level.

The FF Files describe the Data Structure per Message Type and include security marks. Security marks or tags are based on an assigned location within the messages or data words that identify, for that message or word, the level of classification as determined by the developer or a system expert using the program security classification guide or other classification directive in place at the time of development. This means that if the security levels change at a later date, changes would need to be implemented in the TDT as well.

Each security mark is applied to a piece of a data block of the IDD defined data structure. The security marks can be a single bit, a few bits, or a group of bits or bytes. The security level is defined by the review processes in the procedures. In one embodiment, the Trusted Download Toolkit filters a binary file on both variable type and bit wise levels in accordance with security marks provided in FF text files. TDT filters the user selected data classification out of mixed classified and unclassified data. The filters (i.e., the FF attributes) are selectable and used to select the desired output content such that the output could be filtered to be: unclassified, confidential, secret, top secret, or any combination of the data classification level contained within the data. The FF attributes can be used to identify the data structures and/or security markers, assuring that the selected classification levels of data are identified.

The TDT can generate an output in the form of filtered plain text files that are transferred to an unclassified network. Classified data is output to a storage device 24 in the classified environment. Unclassified data is output to the storage device 18 in the unclassified environment.

The FFs provide a set-up file for the TDT that breaks down the target input data (i.e., the data that includes both classified and unclassified data) as defined by the system design documentation so the TDT knows where and how to identify the classified and unclassified data.

The FF attributes can include, for example, the attributes listed in Table 1. The attributes are used to describe arbitrary data structures details. The attributes describe/define "what is placed where in a binary data stream".

Table 1 includes descriptions of 14 attributes in one embodiment of the FF.

TABLE 1

| | Field Properties in FF | | | |
|---|---|---|---|---|
| Attribute Name | Allowed Values | Default Value | Verified by TDT | Description |
| FieldName | Any String | N/A | N/A | Name of the field, the 1st Attribute per Field. |
| FieldSecurtiy | U; S; M | N/A | Only U and S allowed if no Bitwise subfields, otherwise M allowed if Bitwise | 1. U—Unclassified 2. S—Secret 3. M—Mixed Bitwise Subfields. |

TABLE 1-continued

Field Properties in FF

| Attribute Name | Allowed Values | Default Value | Verified by TDT | Description |
| --- | --- | --- | --- | --- |
| | | | subfields got both U and S security tags (see SubSecurity attribute). Verified for availability. Verified for Required order in attribute lists per field | The 2nd Attribute per Field |
| FieldType | INT32S; INT32U; FLOAT32; STRING; etc (see Field Types) | N/A | Only allowed values per type. Verified for availability. Verified for Required order in attribute lists per field | Field Variable Type. The third Attribute per Field |
| FieldLength | Numeric | −1 | Convertibility to Number, Greater than 0 for String Types, less or equal to the MaxFieldLength in TDT-Settings.txt | The length of the string. −1 indicates a variable with default length. For Strings should be a positive number less than the max for the Field Length specified in TDT settings file. |
| IsPhmData | Yes; No | Yes | Only Yes and No allowed | Data of this field should be included when PHM Report selected via Tool's GUI |
| FieldRepeatedTimes | Numeric | −1 | Convertibility to Number | Constant Repetition of the field from IDD. −1 indicates no repetition |
| IsRepeatedCount | Yes; No | No | Only Yes and No allowed | Does this field represent a field repetition number in a binary file for the current message? |
| RepeatedID | Numeric | −1 | Convertibility to Number (anything from 0 to 32767) | An arbitrary ID for a variable times repeated field. Applied to fields with Yes for IsRepeatedCount as well. −1 means not applicable. If within the group/subgroups use a subgroup with 1 field instead |
| GroupRepeatedTimes | Numeric | −1 | Convertibility to Number | Constant Repetition of the Data Structure from IDD. −1 indicates no repetition |
| IsGroupCount | Yes; No | No | Only Yes and No allowed | Does this field represent a data structure repetition number in a binary file for the current message? |
| GroupID | Numeric | −1 | Convertibility to Number (anything from 0 to 32767) | An arbitrary data structure ID for a group of fields. Applied to fields with Yes for |

TABLE 1-continued

Field Properties in FF

| Attribute Name | Allowed Values | Default Value | Verified by TDT | Description |
|---|---|---|---|---|
| | | | | IsGroupCount as well. −1 means not applicable |
| SubBitNames | Comma Separated String | Nothing | Number of Names should match with the Number of Indexes in SubBitIndex; | The Names of Bit-wise Fields as a subset of INT16U or INT32U Field Types. Fields with names "Spare", "Reserved" will be omitted in the generated report. "Empty" may be used for the last portion of unused bits (optional). If Nothing then No Bitwise Sub-Fields. Should proceed SubBitIndex and SubSecurity in the Format File |
| SubBitIndex | Comma Separated String | Nothing | Number of Indexes should match with the Number of Names in SubBitNames; Convertibility to Number for each Index, ascending order | The 1-based starting Indexes (positions) of Bit-Level Fields as a subset of the Variable Type, if Nothing then No Bitwise Sub-Fields |
| SubSecurity | Comma Separated String | Nothing. If not provided and FieldSecurity is not M then default value is inherited from FieldSecurity | Number of Security Marks should match with the Number of Names in SubBitNames; "U" or "S" | Bit-wise Sub-Security value for bit-wise Subfields. If Nothing then No Bitwise Sub-Fields |

Sub-Structures, with a variable number of repetitions at each subsequent message can be provided within the raw binary data files or via a constant number of repetitions provided by the IDD. The files to be decoded and filtered may contain data messages within data messages. These layers are generated as this information passes through processors, and wrappers are added to the initial sourced data.

In one embodiment, the TDT receives the files to be analyzed as streaming data. In general, streaming data refers to any file (e.g., data) that passes between devices, nodes, etc. The classified data streams are created by certain rules. The data can be provided in the nested data structures, or layers, explained above. Any nested data structures (i.e., layers) at any location can have as many repetitions per subsequent data block as needed per that data block as defined in the description documentation. Each data block is a piece of data in a data stream. The data blocks are generally considered to be the payload of the messages (i.e., not header or wrapper data).

The TDT can produce text output files including, for example, the Report Name, Data Source, Message Type, Security Option and the PHM/Complete Data option. Fields are presented with appropriate margins in accordance with nested level of data structures they belong to. Each field can include a security mark, field numbers calculated by the TDT, field names and the values. Bit-wise fields can also be provided as key/value pairs with security marks.

The TDT can process data blocks of variable length per subsequent message block as defined in the IDDs. This variable length is obtained by the TDT from different sources (e.g., included in the Format Files, or within the Binary file being decoded). The process is controllable by human readable Format Files used by the TDT.

The TDT can be approved for Trusted Download by declaration of its way of processing the Trusted Download process. The TDT capabilities are compatible with data structures of possible classified data residing on the classified networks. FFs allow the TDT to bridge two worlds—the classified data (with a currently known or unknown data structure) and the approved tool for Trusted Download. The FF file provides the assurances that the TDT filtering is as expected.

Since the FF are generated based on the IDDs, the system experts provide the IDD review and identify the classified data contained within their IDD so that the FF uses these expert determinations for filtering and the TDT user has the expert assurances as a reference. The system expert uses the IDD source description and any number of the 14 attributes in Table 1 above to identify the data that is, or is not, classified. System experts are the technical leads and design engineers for devices, systems and subsystems. These experts should be the most knowledgeable of their devices and the classification levels for data passing through these devices. Generally, these experts utilize the program level security classification guide as their reference. System experts prevent any misunderstanding in "IDD to FF Translation". Contractually specified data structures include additional verbal descriptions necessary to complete the IDD structures. The TDT Format Files provide comprehensive description. In addition, the FFs are both human and machine readable and understandable.

The "Trusted Download Toolkit" (TDT) replaces manual selective random checking approval of each downloaded data, with an automated process, which involves only one time approval of TDT, Data Structures Description Method and Data Maintenance Procedures for Trusted Downloads. The Interface Definition Description (IDD) per message type is separated from the TDT and provided in the Data Structure Format Files (FF). TDT License and Data Sources files provide TDT licensing and settings details. They also define the Data Sources and Messages per Data Source. This defines overall directory structure in use by the TDT.

A single FF file can apply to multiple data messages of the same type. This means that for any identified file type that follows the description document identified formats, the TDT can identify the filters to apply to identify the classified and unclassified data.

FF files can be approved per message type. Once the FF is approved, there would not be a need to check the data decoded each time. If anything is changed in the FF structures, then within minutes it can be updated and re-approved due to their simplicity and flexibility.

Once any local procedures for data Trusted Download are complied with, the NISPOM security guide identifies the files for review that must be in a human readable format (text in the described embodiments) prior to transfer, and the TDT provides these files in the correct format.

The TDT has the ability to decode binary data based on data structures of any complexity can be used for decoding binary files for any purpose. The TDT application is designed to generate text files for Trusted Download from any kind of classified files produced by subsystems.

TDT provides a generic feature for filtering out pieces of data having different levels of classification based on message structure itself. By describing Data Structures per message type in a separate text file, the Trusted Download Toolkit (TDT) replaces the "Each Time Data Approval" with a "One Time Trusted Download Tool/Data Structures/Data Maintenance Procedures Approval" for a Trusted Download of unclassified data from a system, program, database, computer file, or other product that includes both unclassified and classified data. The TDT can provide automated and controllable review of files containing large quantities of data and can identify which is classified and which is not.

The TDT can be used to screen and pass the unclassified data, or a collection of data having any identified classification level, from a higher classified system applying the Defense Security Service (DSS) approved Trusted Download Procedures as a guideline for products larger than is reasonable for human review on a regular basis.

The TDT generates filtered unclassified plain text files for unclassified databases and purposes. That is, the TDT can extract, decode and filter the Unclassified Data from the Binary Secret Data and place it in plain text files. The plain text files can be used as trusted downloaded unclassified files for unclassified databases and purposes.

TDT uses plain text FFs as sources for instructions so there is no need of any verification for viruses. TDT instructions files are both human and machine readable. Thus, there is no hidden information needed to drive the TDT.

The TDT can generically handle not-well-structured binary files when it is not possible to make a judgment in advance what piece of information (e.g., the positions of bytes) will be secret as intended, because the source of this information may fall out of standard data structure description definitions. This relates to the number of repetitions of "Well-Structured" pieces, which makes the overall message/file "Not-Well-Structured". Particularly, the source of information can be the binary file itself, human-word based descriptions in IDD documents, etc. The TDT defines its own language for this abstraction (i.e., the Format Files) and it can be implemented within a plain text file; another requirement for Trusted Download procedures. The overall generic nature of the TDT and its human and machine readable Format Files allow for managing the TDT for its capabilities of "does" and "doesn't" as required. The TDT comes with its' procedural requirements embedded into the TDT to exclude any human procedural error in several levels of confidence.

Code used in the TDT should be generic. Once approved for Trusted Download, it should not need to be updated when data structures are changed or newly provided, thus no consequent approvals of the TDT are needed.

Data Structures should be provided outside of the application in Text Files so they can be viewed and understood for approval separately from the Tool. The TDT is able to decode messages in Data Structures that may have hierarchies of nested within each other sub data structures, predefined or variable repetition numbers of nested structures and bit-wise fields at any level.

The TDT may be configured to filter any field at any nested level or just the required bits of the field. The TDT may also be used in accordance with predefined procedures excluding any security leak due to data structure updates or other file maintenance procedures.

As used in this description, the term "system" includes, for example, a system, network, program, database, computer file, or other product that includes unclassified data, or a combination of unclassified and classified data.

Whereas particular embodiments of this invention have been described above for purposes of illustration, it will be evident to those skilled in the art that numerous variations of the details of the present invention may be made without departing from the invention.

What is claimed is:

1. A method of extracting unclassified data from a collection of data including both classified data and unclassified data, the method comprising:
providing a plain text format file including a plurality of attributes in a computer system that includes a classified environment having a collection of data, which includes messages of both classified binary data and unclassified binary data, wherein the plain text format file describes each of the attributes in a message data structure in a classified network on a message type basis, wherein at least one of the attributes comprises a security mark;
executing a software application within the classified environment, the software application comprising a trusted download toolkit programmed for:
(a) processing at least one message contained within the collection of data by receiving target input data associated with the message, wherein the target input data comprises a binary data stream comprising classified binary data, a binary data stream comprising unclassified binary data, or a combination thereof, (b) identifying security mark data in at least one of the binary data streams, and (c) identifying a level of classification for at least a portion of the target input data in response to the security mark data;

wherein the trusted download toolkit is independent of the message data structure within the classified environment and extracting at least a portion of the identified unclassified binary data from the collection of data in the classified environment in response to the identified level of classification.

2. The method of claim 1, wherein the format file includes multiple security marks each having an associated level of classification comprising unclassified, classified, confidential, secret, top secret, or a combination thereof.

3. The method of claim 1, wherein the collection of data includes binary files and the binary files are filtered on both variable type and bit wise levels in accordance with at least one of the security marks.

4. The method of claim 1, wherein the collection of data follows a defined data structure criteria that is consistent with system description documentation.

5. The method of claim 4, wherein a message structure of files in the collection of data are described by an Object Management Group Interface Description Document Language.

6. The method of claim 1, wherein the collection of data includes nested data.

7. The method of claim 1, wherein the trusted download toolkit is further programmed for extracting, decoding, and filtering the identified unclassified data and storing the unclassified data in plain text files.

8. The method of claim 7, wherein the trusted download toolkit is further programmed for using at least one of the attributes to decode message reports written into a binary file.

9. An apparatus comprising:
a computer system including a classified environment including a collection of data including both classified binary data and unclassified binary data;
a plain text format file including a plurality of attributes, wherein the plain text format file describes each of the attributes in a message data structure in a classified network on a message type basis, wherein at least one of the attributes comprises a security mark;
a software application programmed for execution within the classified environment, the software application comprising a trusted download toolkit programmed for:

(a) processing at least one message contained within the collection of data by receiving target input data associated with the message, wherein the target input data comprises a binary data stream comprising classified binary data, a binary data stream comprising unclassified binary data, or a combination thereof, (b) identifying security mark data in at least one of the binary data streams, (c) identifying a level of classification for at least a portion of the target input data in response to the security mark data, and (d) extracting at least a portion of the unclassified binary data from the collection of data in the classified environment in response to the identified level of classification;

wherein the trusted download toolkit is independent of the message data structure within the classified environment; and an unclassified environment including a memory configured to receive the extracted unclassified binary data.

10. The apparatus of claim 9, wherein the format file includes multiple security marks each having an associated level of classification comprising unclassified, classified, confidential, secret, top secret, or a combination thereof.

11. The apparatus of claim 9, wherein the collection of data includes binary files and the trusted download toolkit is configured to filter the binary files on both variable type and bit wise levels in accordance with security marks provided in the format file.

12. The apparatus of claim 9, wherein the collection of data follows a defined data structure criteria that is consistent with system description documentation.

13. The apparatus of claim 12, wherein a message structure of files in the collection of data are described by an Object Management Group Interface Description Document Language.

14. The apparatus of claim 9, wherein the identified unclassified data is placed in plain text files.

15. The apparatus of claim 9, wherein the collection of data includes nested data.

16. The apparatus of claim 9, wherein the trusted download toolkit is further programmed for extracting, decoding, and filtering the identified unclassified data and storing the unclassified data in plain text files.

17. The apparatus of claim 16, wherein the trusted download toolkit is configured to use at least one of the attributes to decode message reports written into a binary file.

* * * * *